April 20, 1971  S. A. POLICHT  3,575,770
FILM SPLICING APPARATUS
Filed Sept. 27, 1968  5 Sheets-Sheet 1
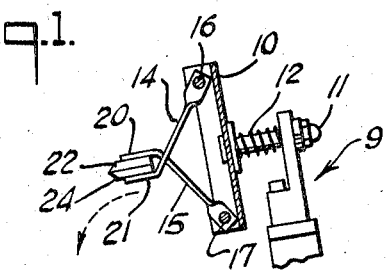
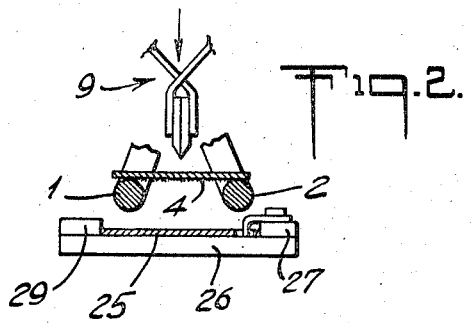
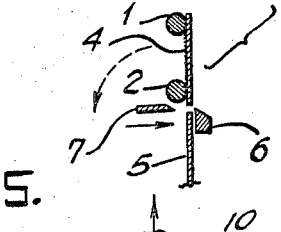
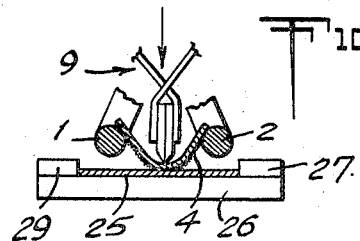
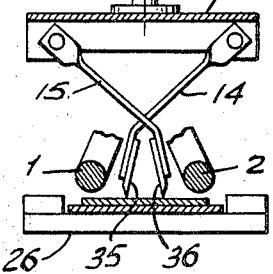
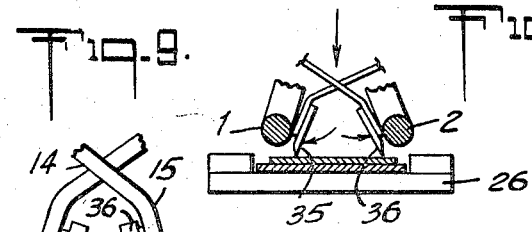
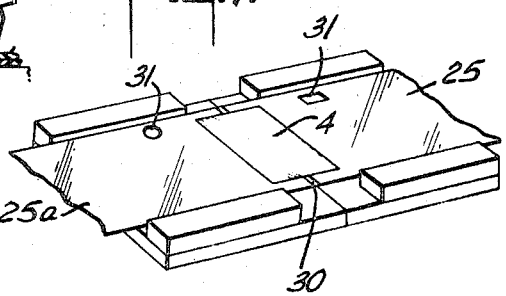
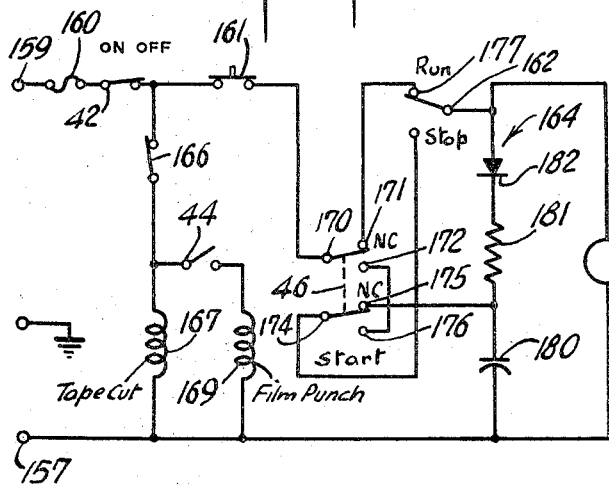
INVENTOR
STANISLAW A. POLICHT
BY
ATTORNEY

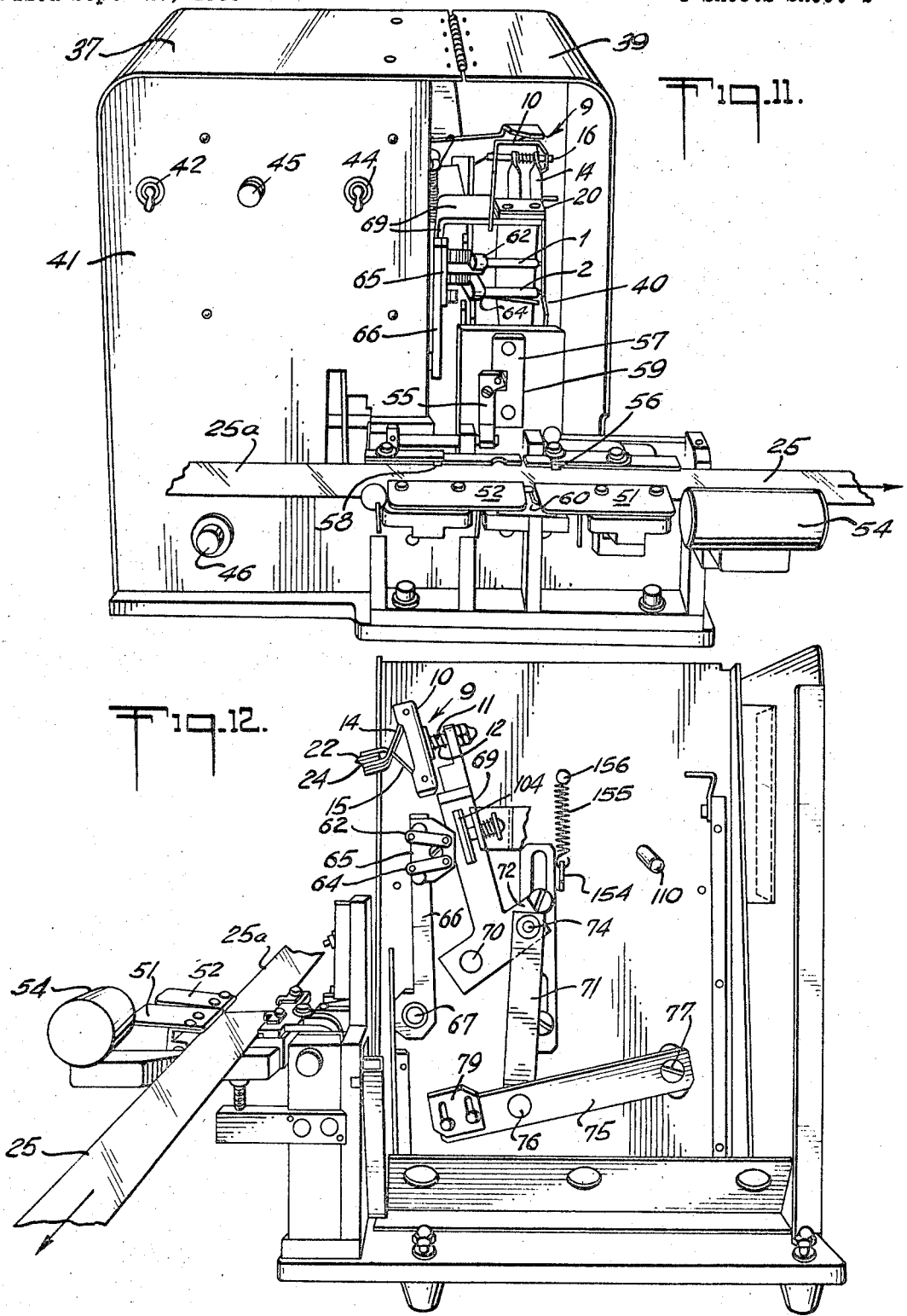

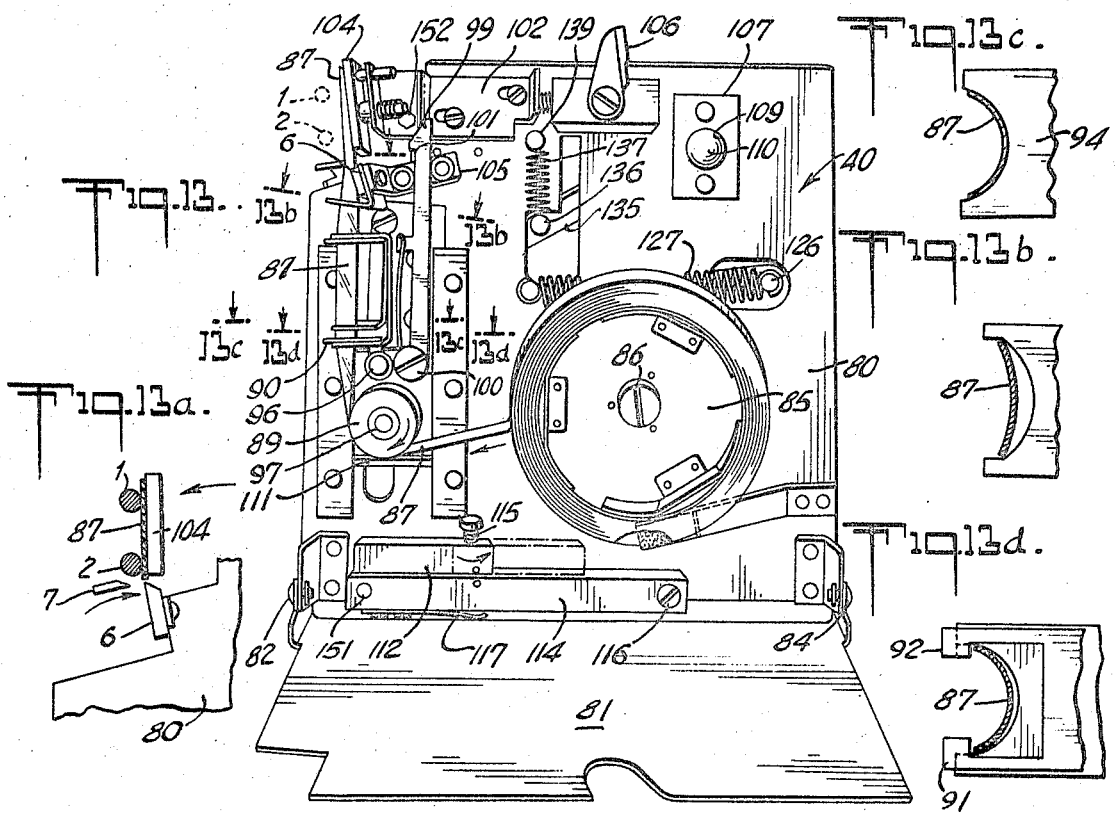
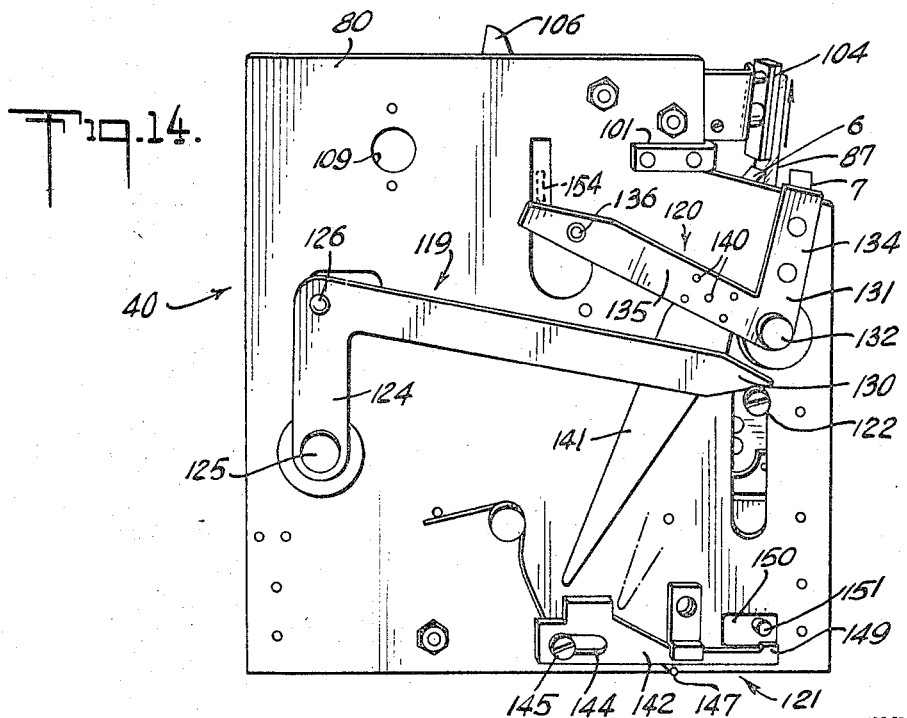

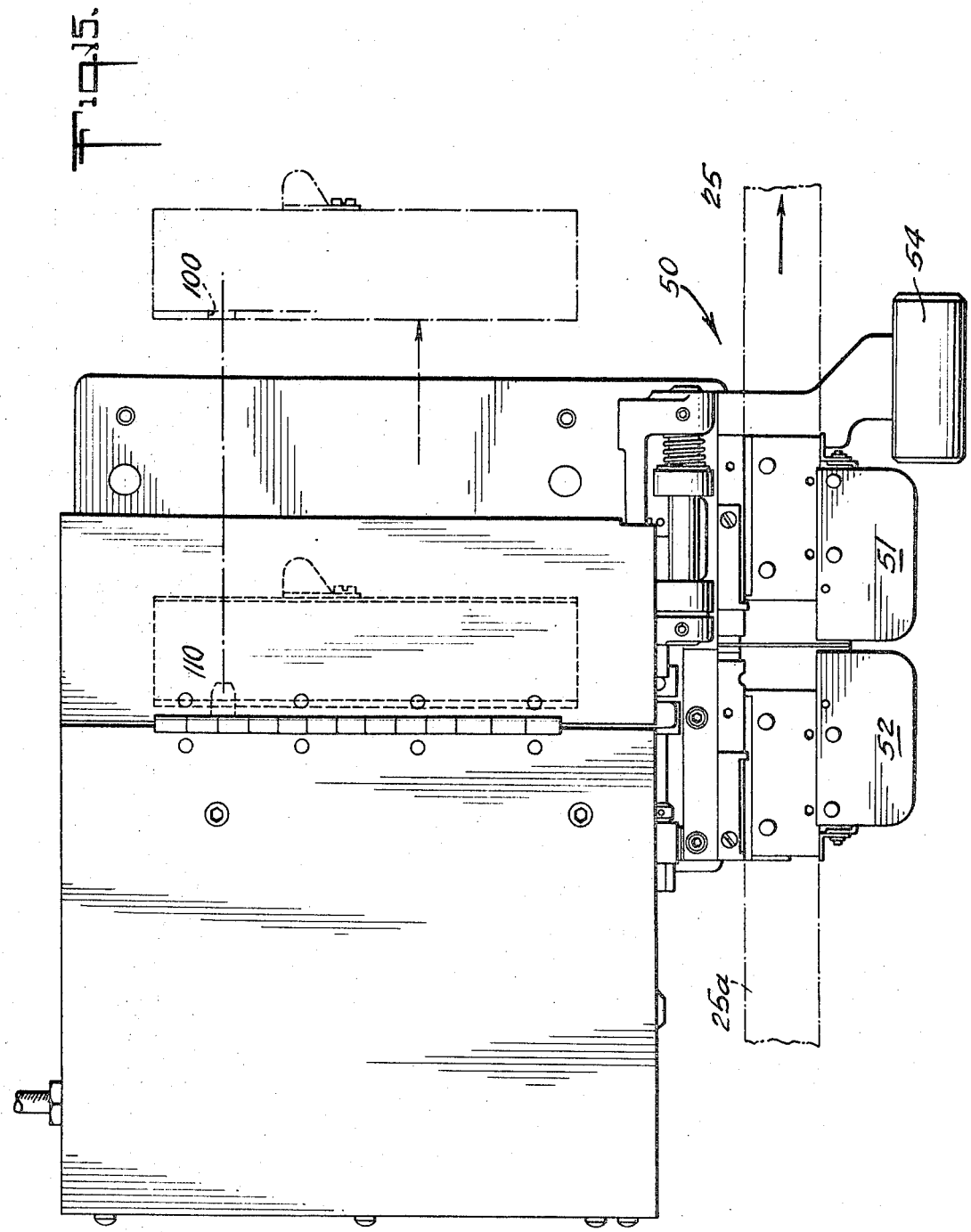

United States Patent Office 3,575,770
Patented Apr. 20, 1971

3,575,770
FILM SPLICING APPARATUS
Stanislaw A. Policht, Closter, N.J., assignor to
Berkey Photo Inc., New York, N.Y.
Filed Sept. 27, 1968, Ser. No. 763,322
Int. Cl. B31f 5/00; B65h 21/00
U.S. Cl. 156—506
10 Claims

ABSTRACT OF THE DISCLOSURE

A film splicing apparatus is shown for attaching two lengths of undeveloped film in end to end relationship for photographic processing including developing, printing, etc. A schematic drawing is shown of means to apply a tape patch to the closely adjacent ends of the film. The structure involves a pushing member making contact with the center of the patch and spreading outwardly across the patch as pressure is applied thereto. Upon reaching the end of the patch the wiping mechanism moves back to the center thereby providing a double wiping pressure for the tape patch against the film. The apparatus for severing the tape patch is shown together with linkage means for feeding a predetermined length of tape to a cutter for pick up and transfer to the film. The tape supply roll is shown in a replaceable cartridge incorporating means holding the end of the tape in proper relationship for engagement by the cutter immediately upon the introduction of the cartridge to the splicing apparatus.

---

The present invention relates to photograph and particularly to a film splicing apparatus which is expecially adapted for rapidly splicing a number of short lengths of unexposed film into one continuous strip in total darkness prior to the processing of the film.

It is important in a film splicing apparatus that the lengths of undeveloped film remain attached to each other inasmuch as the entire length of the spliced film as it passes through the processing machine may be 3000 feet in length including as many as 2000 splices. It is quite obvious that if a splice were to become unfastened there might be a jam up in the film handling machines which could result in the undeveloped film remaining in a solution for such a great period that the pictures are destroyed. Thus it is of the utmost importance that the splice be reliable.

In accordance with the present invention a film splicing apparatus is provided adapted to hold two lengths of film in end to end relationship and to splice the film by providing a severed length of splicing tape which is automatically applied in position across the abutting ends of film. A feature of the invention is the action wherein the tape application is first made along a center line, the tape being thereafter wiped outwardly from the center so as to squeegee out any possible air bubbles or air spaces and to make good contact with the film.

A still further feature of the invention is the provision wherein the splice is again wiped so that there is a double wiping action of the tape against the film assuring that good contact is made therewith. A still further feature of the invention is the provision of a cartridge for the tape so that when the preceding roll of tape has been used up to a switch of cartirdge may be made. The new cartridge has the tape in position so that without threading or further means other than the insertion of the cartridge in position the splicing apparatus is again ready for use. This is an important advantage inasmuch as it should be remembered that the entire splicing operation is performed in the dark and the tape may run out while opened film rolls are awaiting splicing in the machine.

An object of the invention is to provide a film splicing apparatus which is simple and economical in manufacture, efficient in operation and durable in use.

Other objects and advantages of the invention will be apparent from the following description and from the accompanying drawings which show, by way of example, an embodiment of the invention.

In the drawings:

FIG. 1 is a fragmentary schematic drawing of the operating ends of the mechanisms which transfer the severed length of tape adjacent to the ends of the film and the means to apply the tape to the film.

FIG. 2 is a view similar to FIG. 1 but showing the apparatus in position above abutting ends of a film before the splice has been applied thereto.

FIG. 3 shows the next step in the application of the splice to the film wherein the means to apply the tape to the film has made contact between the tape and the film along a line across the abutting ends of the film.

FIG. 4 shows the next step in which the means to apply the tape to the film has wiped across the film displacing the means to transfer the tape adjacent to the film.

FIG. 5 shows the next step after the means to apply the tape to the film has wiped the tape across the film and is now returning to the center line, and thus providing the second wiping pressure to the film.

FIG. 6 shows a sectional view of the film with a patch applied thereto.

FIG. 7 is a perspective view showing the tape patch applied to abutting lengths of film, this figure showing the slight space between the ends of the film and also showing a film with a punched hole on the edge.

FIG. 8 illustrates a spliced portion of a film without punched holes and removed from the splicing apparatus.

Figure 16:
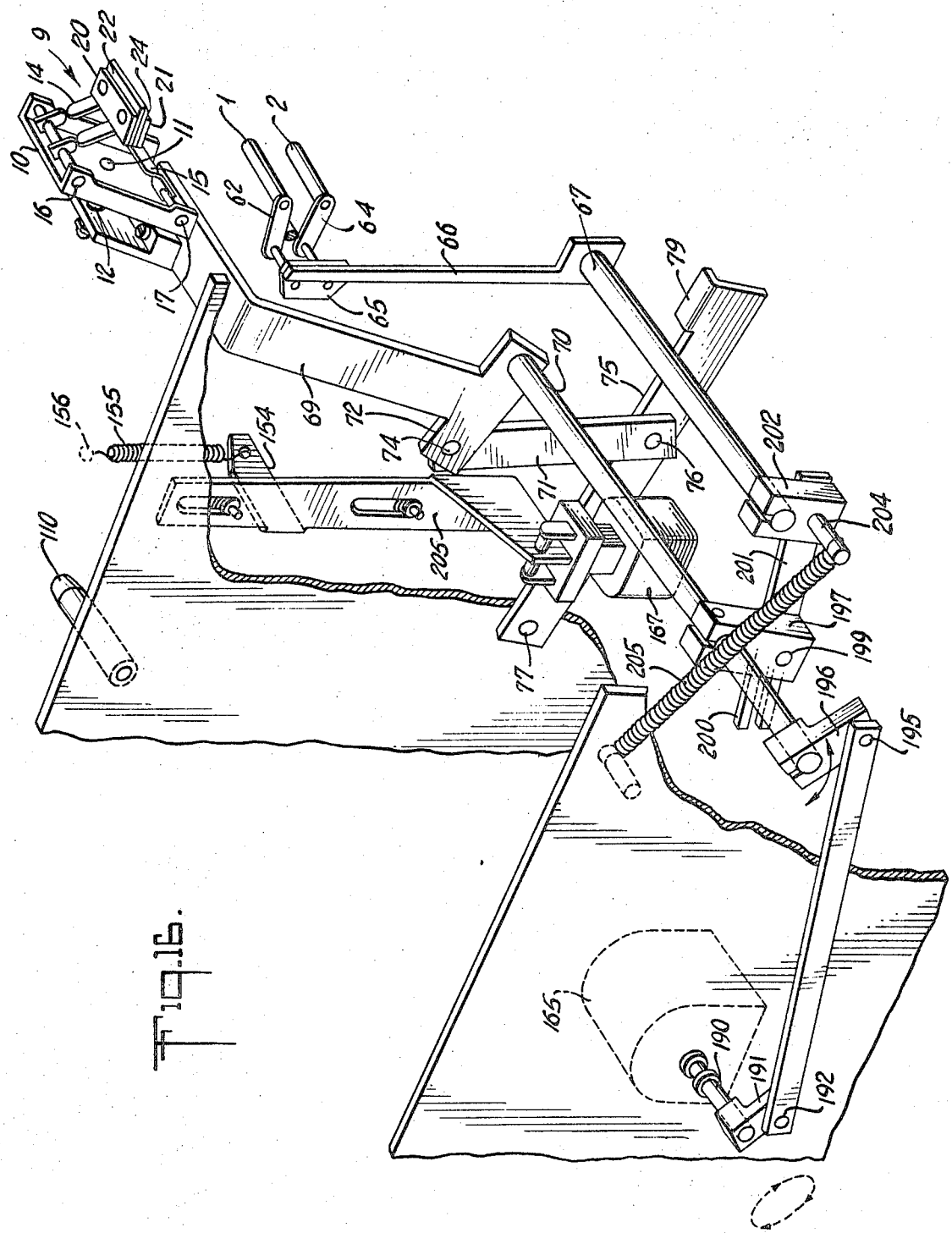

FIG. 9 is a slightly enlarged view of the wipers 14 and 15 illustrating the Teflon coatings 22 and 24.

FIG. 10 is a schematic wiring diagram of the electric circuit of the film splicing apparatus.

FIG. 11 is a front view of the film splicing apparatus as viewed by an operator in position to operate the machine.

FIG. 12 is a side view of the film splicing apparatus with the cover door opened and with the tape cartridge removed.

FIG. 13 is a side view of the tape cartridge with its cover opened.

FIG. 13a shows the severed piece of tape just after having been cut from the tape roll by the tape cutter.

FIG. 13b shows a section of the tape immediately prior to the cutting knife.

FIG. 13c shows a sectional view of the tape as it passes through a spring pressured lever of the shaping mechanism. This view illustrates the curved column-like cross sectional shape of the tape providing rigidity thereto as it is moved upwardly through the tape cutter.

FIG. 13d shows a sectional view of the tape as it passes through the shaping bracket.

It will be noted that the tape at position 13c and 13d is practically the same, the showing of 13d illustrating the hook-like construction bearing against the edges of the tape causing it to assume the curved shape, while FIG. 13c illustrates the spring pressured member urging the tape against the hooks of FIG. 13d.

FIG. 14 is a side view of the tape cartridge.

FIG. 15 is a top view of the film splicing apparatus with the tape cartridge in broken lines and also illustrating in broken lines its position immediately after being removed from the apparatus.

FIG. 16 is a schematic view of a portion of the film splicing apparatus illustrating the operation of the drive mechanism.

Referring to the drawings there is shown in FIGS. 1 through 8 steps in the application of a splice to closely abutting ends of two lengths of film in end to end relationship. In FIG. 1 there is shown transfer rollers 1 and 2 with a severed length of tape 4 adhering to sides of the rollers. The severed length of tape 4 has just been cut away from the end 5 of a supply roll of tape, an anvil 6 being shown with a cutting knife 7 in juxtaposition thereto. Not shown here but to be described later is means for swinging the transfer rollers 1 and 2 from the position of FIG. 1 towards the film as shown in FIGS. 2 to 5. Positioned above the transfer rollers 4 is the end of a wiping mechanism 9 carrying a wiping head 10 attached to the mechanism by a stud 11 having a spring 12 providing a yielding action for the wiper head. The wiper head 10 carries a pair of wiper members 14 and 15 journalled respectively on pins 16 and 17 providing a pivotable action thereto. Not shown in FIG. 1 but present are springs normally tending to hold the wiper blades 14 and 15 with their lower ends 20 and 21 positioned together. The outer surfaces of the ends 20 and 21 are covered by Teflon coatings 22 and 24, the Teflon providing semi-frictionless surfaces for contact with the tape patch 4 of the tape.

In FIG. 2 there is shown a sectional view of film 25 in position in a film holder 26 having guides 27 and 29 so that the film 25 is positioned accurately.

FIGS. 2–6 show an end view of the film. The guideways maintain the lengths of film in axial alignment. In FIG. 2 the severed end of the tape 4 is shown in a position adjacent the film after the transfer rollers have been swung approximately 90 degrees from the position of FIG. 1 to the position above the film to be spliced. In this figure the operating end of the wiping mechanism 9 has not yet made contact with the severed length of tape 4. In FIG. 3 the wiping mechanism 9 has contacted the severed end of the tape 4 and moved it into contact with the film along the line approximately at the center thereof. In FIG. 4 the wiping mechanism 9 has been spread by pressure against the film in opposition to the springs normally holding the wiper members together and the wiper members have securely pressed the severed tape 4 against the abutting ends of the film 25. It will be noted that because of the slight friction provided between the Teflon ends 22 and 24 and the film splice a slight stretching force is applied to the severed end of the tape 4 thereby assuring the removal of any air between the tape and the film and also giving a slight rubbing action making an excellent contact of the edges of the tape with the surface of the film.

In FIG. 5 the tape patch 4 has been applied to the film and the wiping mechanism has started to raise upwardly. As the wiping mechanism making its return stroke is raised the wiper tips again pass over the tape patch providing a second wiping action, whereby proper adhesion of the tape patch to the film is assured.

The finished splice is shown in section in FIG. 6 and in perspective in FIG. 7, FIG. 7 showing the abutting ends of the film lengths 25 and 25a slightly spaced as indicated at 30. In addition FIG. 7 shows registry punchings 31 along the lengths of film. As may be seen in FIG. 7 the tape patch 4 is slightly shorter than the width of the film to assure that there will be no posible sticking of the adhesive of the tape patch to the film handling machinery as the film is processed therethrough.

In the enlarged view of the wiper blades of FIG. 9 it will be noted that the outer ends of the wiper arms 14 and 15 are apertured to receive screws 32 and 34 engaging in wiper blades 35 and 36, the wiper blades 35 and 36 being covered by Teflon tape 22 and 24.

The mechanism for operating the transfer rollers and wiping mechanism will now be described. In FIG. 11 there is shown a housing 37 enclosing the mechanism, the housing 37 being provided with a hinged door 39 at one side thereof which provides access to install or remove a tape cartridge 40.

A panel 41 is positioned facing the operator and fitted with switches 42 and 44, the switch 42 being the "on and off" power switch while the switch 44 operates a punching mechanism. A fuse block 45 is positioned between the switches 42 and 44; on the lower portion of the panel is a start button 46.

Positioned in front of the panel 41, and as may be seen best in FIGS. 11 and 15, is film cutting mechanism 50 incorporating the usual film clamps 51 and 52. A handle 54 is operative to lift the entire right side of the mechanism including the film clamp 51. The purpose of the film cutting mechanism 50 is to clip the rough ends of the film and maintain the trimmed ends of the film in position slightly spaced for the application of the tape patch 4. In addition, in connection with the film cutting mechanism 50 there is a punch 55 which is used to register the film to maintain pitch, or the proper spacing between adjacent negatives, of two lengths of film for proper handling of the film through the various handling machines.

The structure of the machine may perhaps best be described by setting out its operation.

In FIG. 11 a length of film 25 is shown in axial alignment with a second film length 25a. In order to position the film 25a in place the film clamps 51 and 52 have been first depressed, then the film 25 on the right side and perforations, if any, aligned with registration pin 56. The film clamp 51 is then lifted upwardly which clamps the film 25 in position. Next the handle 54 is lifted which raises the entire mechanism associated with the film clamp 51 and carries with it the film 25 towards a cutter 57 having a cutting edge 59. The rough end edge of the film 25 is cut off and falls away. While the handle 54 is raised the second length of film 25a is positioned in the lefthand side of the machine and its perforations if any placed in registration with the lefthand registration pin 58. The film clamp 52 is lifted so as to clamp the film 25a in position. The handle 54 is then swung downwardly bringing with it cutter blade 60 carried downwardly with mechanism operated by the handle 54, the cutter 60 cutting off the outermost end of the film length 25a. The cutters are so arranged in position that the slight space 30 shown in FIG. 7 is left between the abutting ends of the film. Now if it is desired to punch a phasing hole 31 in the film strip 25a a punching mechanism carrying a punch 61 is swung downwardly to punch the film. The operation of the punch will be described later.

So far the film holding mechanism has been described together with an operation of the means for applying the tape patch 4 to the ends of the film. The mechanism for operating the transfer rollers l and 2 and the wiping mechanism 9 will next be described, leaving the description of the replaceable cartridge thereafter. As will be noted in FIG. 11 the transfer rollers l and 2 are carried by swingable arms 62 and 64, both of which are attached to a roller head 65 (FIG. 12) swung by a roller head operating arm 66 carried by a shaft 67. By suitable mechanism the shaft 67 is oscillated so as to be turned about 90 degrees from the upward position shown in FIG. 12 downwardly to the left against the film 25. Similarly the wiping mechanism 9 by means of its operating arm 69 is swung about its operating shaft 70 approximately the same angle, the swinging movement of the shafts being so arranged that the rollers 66 position the tape patch 4 above the film as shown in FIG. 2 before contact is made with the tape patch 4 by the wiper blade tips 20 and 21.

Means for advancing the tape is operated by the shaft 70 and includes linkage arm 71 pivoted to an extension 72 of the arm 69 by a pin 74. The arm 71 is attached to another arm 75 by a pin 76 for pivotal movement of the arm 75 about a pin 77 fixed to the frame. An operating pad 79 is attached to the arm 75 for the operation of the tape advance mechanism in the cartridge as will be described later.

The tape cartridge 40 shown in FIGS. 13 and 14 provides means to replenish the tape in the film splicing apparatus more or less automatically in that by the changing of the cartridge a new roll of tape with its end threaded is made available for use. The cartridge 40 includes a main plate 80 with a cover plate 81 hinged to main plate 80 by hinges 82 and 84. A roll 85 carrying a supply of tape is pivotally mounted on a stud 86, the outer end of the tape indicated at 87 being threaded past a roller 89. As the tape end 87 is moved upwardly it passes through a guide member 90 with hooked ends 91 and 92, thence through a spring pressed guide member 94 and through another guide member 95 similar to the guide member 90 and also having hooks at its ends similar to the hooks 91 and 92. It will thus be seen that by means of the guide members 90 and 95 the end of the tape 87 is given a curved or column-like shape giving rigidity thereto so that it can be moved upwardly against the force of gravity into proximity to the anvil 6 and the cutter 7. The movement of the tape end 87 is achieved by a tape advance mechanism 96 which carries the guide members 90 and 94 together with pivotable mounting means for the roller 89. Also pivotably mounted on the tape advance mechanism 96 is a latching member 99 pivotably mounted by a stud 100 and adapted to engage a latch 101 attached to the main plate 80. Also attached to the main plate 80 is a spring mounted tape clamp bracket 102 having a face plate 104 with a rubber coated surface. The anvil 6 is carried on the main plate 80 by a bracket 105. Latching means 106 is provided to hold the cover 81 up in place. Main plate 80 is provided with an adjustable pad 107 apertured as indicated at 109 to receive a positioning pin 110 carried by the main frame.

The tape advance mechanism 96 is provided with a stop surface 111 adapted to abut against either a swingable stop surface 112 or a second stop member 114. The swingable stop surface 112 is pivoted at 115 while the second stop member 114 is pivotable at 116. On the undersurface of the second stop member 114 is a leaf spring 117.

On the rear of the main plate 80 are mechanisms for moving the tape advance mechanism 96 downwardly indicated by numeral 119, for operating the cutter indicated by numeral 120 and mechanism 121 for moving the tape advance mechanism 96 still further downwardly, the tape advance mechanism 96 being moved upwardly by the operating pad 79 of FIG. 12. The pad 79 engages a stud 122 attached to the baseplate of the tape advance mechanism 96 to lift the tape advance mechanism upwardly.

The mechanism 119 for moving the tape advance mechanism 96 downwardly includes a generally L-shaped lever 124 pivotally mounted by a stud 125 fixed to the main plate 80, the L-shaped lever 124 having a pin 126 having attached thereto a spring 127 with its other end tied to a pin 129 attached to main plate 80. The outer end of the L-shaped lever 124 is pointed as indicated at 130.

The cutter operating mechanism 120 includes a generally L-shaped arm 131 pivotably mounted by a stud 132 carried in the main plate 80. Arm 134 of the L-shaped member 131 carries at its outer end the knife 7. The other arm 135 of the L-shaped member 131 carries a pin 136 which is attached to a return spring 137 having its other end attached to a pin 139 positioned in the main plate 80. The generally L-shaped arm 131 has attached thereto as by welding 140 an arm 141 positioned generally at right angles to the arm 135.

The mechanism 121 for moving the tape advance mechanism 96 still further downward includes a stop plate member 142 having an elongated opening 144 receiving a stud 145 for lateral slideable movement of the plate 142 guided between a bracket 146 and a pin 147. The outer end of the stop plate member 142 is provided with an angled end 149 extending through an opening 150 in the main plate 80. Extending through the opening 150 is a stop pin 151 positioned in the stop member 114.

In the description concerning the showings of FIGS. 1 to 9 there was a description of the application of the tape patch 4 to the ends of the film 25 and 25a. The operation of the mechanism to provide the tape patch 4 will now be described. The cartridge 40 when ready for inserton in place over the positioning pin 110 has the tape end 87 threaded into position ready for immediate operation of the knife 7 so that a severed tape patch 4 will be picked up by the transfer rollers 1 and 2. This is achieved by having the tape end 87 threaded through the guide members 90 and 94 and projecting upwardly in front of face plate 104. With the tape end 87 in this position the tape advance mechanism 96 must be held in the upward position by engagement of the latch 99 with the stop 101. The tape end 87 is ready to provide a tape patch 4. When the transfer rollers 1 and 2 are swung upwardly to press the end of tape 87 against face plate 104, the tape advance mechanism 96 is released by contact of a pin 152 against the latching member 99. The pin 152 is attached to the tape clamp bracket 102 which is moved backwardly by pressure of the transfer rollers 1 and 2 against the tape end 87 against the face plate 104. The tape advance mechanism 96 is moved downwardly by action of the mechanism 119 including a generally L-shaped lever 124 which is swung clockwise so that the pointed end 130 engages the pin 122 pushing the tape advance mechanism 96 downwardly carrying with it the roller 89 thereby pulling a supply of tape away from the roll 85. The downward movement of the tape advance mechanism 96 is restricted by contact of its top surface 111 with the swingable stop surface 112 if it is positioned inwardly. If a longer tape patch 4 is desired the swingable stop surface 112 is swung outwardly so that the stop surface 111 makes contact with the upper surface of the second stop member 114, thereby drawing more tape from the roll 85. At this point the knife 7 is operated to sever the tape patch from the end of the tape end 87. This operation is achieved by movement of a pin 154 normally held in the upward position by a spring 155 attached to a stud 156 fixed to main frame of the splicing apparatus. The pin 154 is actuated by solenoid 167 and engages the tapered outer end of the arm 135 swinging it downward and thereby swinging the knife 7 counterclockwise (FIG. 14) to cut the tape 87 against the anvil 6.

Simultaneously as the knife 7 was moved in the counterclockwise direction to cut the tape 87 the arm 141 has been swung over the upwardly projecting portion of the stop plate member 142 to the dashed line position indicated at 141a. When the arm 135 is released by the solenoid actuated pin 154 under the action of the spring 137 the arm 141 is swung in the clockwise direction from its indicated direction at 141a to move the stop plate member 142 to the left thereby releasing its end 149 from beneath the stop pin 151, allowing the second stop member 114 to drop, thereby dropping the stop surface 111 and moving the tape advance mechanism 96 still further downward so that the severed end of tape 87 is dropped away from the anvil 6 and the knife 7 preventing a possible jamming action later as it is moved upwardly to provide a new end to be cut off for the succeeding tape patch 4.

The electric circuit shown schematically in FIG. 10 includes a pair of terminals 157 and 159 adapted to be connected to a source of current. Terminal 157 is common. Terminal 159 is connected through a fuse 160 to the on-off switch 42 and thence through a safety switch 161 positioned behind the film cutting mechanism 50 and opened when the table is lifted upwardly out of position. The switch 161 is connected to the button operated double throw double pole starting switch 46, and thence through a cam operated switch 162 to a network 164 in parallel with a motor 165. Ahead of the switch 161 there is connected a lead to a cam operated switch 166 which supplies a solenoid 167 for the cutter, the solenoid 167 operating the pin 154. Connected in parallel with the supply for the solenoid 167 is the punch operating switch 44 connected to a solenoid 169 for operating the film punch 61. The button operated double throw double pole starting switch 46 includes one pole 170 switched between terminals 171 and 172 and a second pole 174 switched between terminals 175 and 176. Terminal 171 is connected to "run" terminal 177 of the cam operated switch 162. Terminal 172 is connected to the terminal 176. Terminal 174 is connected to "stop" terminal 179 of the cam operated switch 162. Terminal 175 is connected to the midpoint between a capacitor 180 and a resistor 181 of the network 164. A diode 182 is connected between the resistor 181 and the switch 162 completing the network 164.

In the operation of the electrical circuit shown in FIG. 10 in the running position the pushbutton switch 46 has been actuated completing a cycle of the motor which has turned the cam operated switches to the position shown. Cam operated switch 166 is closed and thus the tape cut solenoid 167 is energized and held in the energized position. Thereby the cutter is moved over against the anvil and remains in this position. The switch 44 is energized so that if actuated the punch will operate to perforate the film. The pushbutton switch 46 having been actuated is released and therefore the switch 170 is making contact with the terminal 171 and the motor is running until the cam operated switch 162 is actuated to the stop position 179 thereby discharging the capacitor 180 through terminal 175 and the switch 174 to the stop terminal 179 and through the motor, the discharge of the capacitor acting as a practically instant brake for the motor 165. The motor circuit is then disconnected from the line ready for the next operation which is started by actuation of the pushbutton switch 46 which momentarily connects the switch 170 to the terminal 172 and simultaneously connects the switch 174 to the terminal 176 thereby energizing the switch 162 through its stop position and energizing the motor 165 so that it starts rotation, moving its cam to operate the switches 162 and 166.

The drive mechanism for the swinging movement of the transfer roller head 65 and the wiping mechanism 9 is best understood by referring to FIG. 16.

The motor 165 makes a single revolution for each actuation of the start button 46. At the end of motor shaft 190 is an arm 191 attached by a short shaft or pin 192 to a rod 194 having a short shaft or pin 195 at its outer end attaching it to an arm 196 for oscillation of the shaft 70. For each revolution of the motor 165 there is a forward and backward oscillation of the shaft 70 of about ninety degrees so that the operating arm 69 and the wiping mechanism 9 are swung as described heretofore.

Attached to the shaft 70 is an arm 197 carrying a pin 199 which slides in a guideway 200. The guideway 200 may be a slotted end of a bar 201 pivotably connected to a bar 202 by a pin 204. The bar 202 is fixedly attached to the shaft 67. By this construction for each revolution of the motor 165 and oscillation of the shaft 70 the shaft 67 is also oscillated against the action of spring 205.

The solenoid 167 is actuated by the switch 166 which is cam operated for each revolution of the motor 165. The solenoid 167 moves the slider 205 against the action of the spring 155 to move the pin 154 for actuation of the knife 7.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. Film splicing apparatus comprising a base, film supporting means adapted to hold two lengths of film in end to end relationship, means adapted to support a roll of splicing tape on the base, means adapted to sever a predetermined length of tape from the roll, means to transfer the severed length of tape to a position adjacent to the ends of the film, and means to apply the tape to the film and thereafter to apply pressure to the tape in position on the ends of the film, said means starting its pressure approximately along a line at the center of the severed length of tape.

2. Film splicing apparatus according to claim 1 in which said means to apply the tape to the film applies its pressure with a wiping action outwardly from said line to the edges of the severed length of tape.

3. Film splicing apparatus according to claim 2 in which said means applies its pressure with a wiping action back from the edges of the severed length of tape to said line so that there is a double wiping pressure applied to the tape against the film.

4. Film splicing apparatus according to claim 1 in which said means adapted to support a roll of splicing tape on the base includes a housing and threading mechanism for the tape and carrying said means to sever a predetermined length of tape thereby providing a replaceable loaded tape cartridge assembly which may be easily replaced in total darkness.

5. Film splicing apparatus according to claim 1 in which the means to transfer the severed length of tape to a position adjacent to the ends of the film includes a pair of spaced transfer rollers.

6. Film splicing apparatus according to claim 5 in which the spaced transfer rollers are pivotably mounted for outward swinging movement, spring means being provided to return the rollers to starting position.

7. Film splicing apparatus according to claim 1 in which the means to transfer the severed length of tape to a position adjacent to the ends of the film incorporate linkage means swinging the severed length of tape through an angle of approximately ninety degrees.

8. Film splicing apparatus according to claim 1 in which the means to apply the tape to the film includes a pair of crossed members pivoted at their upper ends, spring means being incorporated to urge the outer ends of the crossed members together.

9. Film splicing apparatus according to claim 8 in which the tips of said crossed members are Teflon coated.

10. Film splicing apparatus according to claim 1 in which is included means to curl the tape along its longitudinal axis thereby to give a column-like cross sectional shape thereto for the stiffening thereof.

References Cited

UNITED STATES PATENTS

| 2,827,104 | 9/1958 | Rives | 156—505 |
| 3,074,467 | 1/1963 | Takats | 156—505 |
| 3,152,227 | 10/1964 | Durio | 156—506 |
| 3,318,754 | 5/1967 | Philippi | 156—505 |
| 3,345,238 | 10/1967 | Vanoni | 156—505 |
| 3,394,040 | 7/1968 | Baumbach | 156—505 |

BENJAMIN A. BORCHELT, Primary Examiner

R. E. HART, Assistant Examiner